US011914322B2

(12) United States Patent
Gould, II et al.

(10) Patent No.: US 11,914,322 B2
(45) Date of Patent: Feb. 27, 2024

(54) DRIVE COUPLER ACTUATION VIA REPLACEABLE UNIT INSERTION IN AN IMAGE FORMING DEVICE

(71) Applicant: LEXMARK INTERNATIONAL, INC., Lexington, KY (US)

(72) Inventors: Bartley Charles Gould, II, Lexington, KY (US); Michael James Shanor, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 17/973,098

(22) Filed: Oct. 25, 2022

(65) Prior Publication Data

US 2023/0185230 A1 Jun. 15, 2023

Related U.S. Application Data

(60) Provisional application No. 63/289,326, filed on Dec. 14, 2021.

(51) Int. Cl.

*G03G 15/00* (2006.01)
*G03G 21/16* (2006.01)
*G03G 21/18* (2006.01)

(52) U.S. Cl.

CPC ....... *G03G 21/1647* (2013.01); *G03G 15/757* (2013.01); *G03G 21/1652* (2013.01); *G03G 21/1842* (2013.01); *G03G 21/186* (2013.01)

(58) Field of Classification Search

CPC ............. G03G 15/757; G03G 15/1615; G03G 21/1647; G03G 21/1652; G03G 21/168; G03G 21/1842; G03G 21/1857; G03G 21/186; G03G 2221/1657

See application file for complete search history.

(56) References Cited

U.S. PATENT DOCUMENTS

| | | | |
|---|---|---|---|
| 7,130,562 B2 | 10/2006 | Foster et al. | |
| 10,126,702 B1 | 11/2018 | Triplett | |
| 11,194,286 B2 | 12/2021 | Amann et al. | |
| 2016/0091857 A1* | 3/2016 | Hashimoto | G03G 21/168 399/117 |
| 2017/0146950 A1* | 5/2017 | Moon | G03G 21/1647 |

FOREIGN PATENT DOCUMENTS

| | | | |
|---|---|---|---|
| EP 3037892 A1 * | 6/2016 | | G03G 15/1615 |

* cited by examiner

*Primary Examiner* — Sophia S Chen

(57) ABSTRACT

An assembly for an electrophotographic image forming device includes a drive coupler movable along an axial direction between a retracted position and an extended position. In the retracted position the drive coupler is disengaged from a drive interface of a first replaceable unit when the first replaceable unit is installed in the image forming device. In the extended position the drive coupler is engaged with the drive interface of the first replaceable unit when the first replaceable unit is installed in the image forming device for providing a rotational force to the drive interface of the first replaceable unit. A lever is operatively connected to the drive coupler such that the lever causes the drive coupler to move from the retracted position to the extended position upon the lever receiving an actuation force from insertion of a second replaceable unit that is toward the drive coupler along the axial direction.

18 Claims, 10 Drawing Sheets

DRIVE COUPLER ACTUATION VIA REPLACEABLE UNIT INSERTION IN AN IMAGE FORMING DEVICE

CROSS REFERENCES TO RELATED APPLICATIONS

This application claims priority to U.S. Provisional Patent Application Ser. No. 63/289,326, filed Dec. 14, 2021, entitled "Drive Retraction System for an Image Forming Device," the content of which is hereby incorporated by reference in its entirety.

BACKGROUND

1. Field of the Disclosure

The present disclosure relates generally to image forming devices and more particularly to drive coupler actuation via replaceable unit insertion in an image forming device.

2. Description of the Related Art

Actuator mechanisms are typically used to actuate drive couplers in an image forming device to couple and decouple with corresponding drive couplers of replaceable units after the replaceable units are installed in the image forming device. In some designs, for example, mechanisms that require manual interaction by users are used to move the drive couplers in the image forming device relative to corresponding drive couplers of the replaceable units, such as by actuating buttons or levers internal to the image forming device, to engage the drive couplers to allow transfer of rotational force to the replaceable units during normal operation and to disengage the drive couplers to allow insertion and removal of the replaceable units from the image forming device. However, the use of manual actuation mechanisms may be cumbersome and not user-friendly. In other designs, linkages for actuating the drive couplers are tied to the motion of an access door. The use of linkages tied to the motion of the access door, however, may require a long linkage back to the drive couplers from the access door, which may increase the size and complexity of the mechanism. Accordingly, it will be appreciated that a more size and cost efficient mechanism for drive coupler actuation is desired.

SUMMARY

An assembly for an electrophotographic image forming device includes a rotatable drive coupler movable along an axial direction of the drive coupler between a retracted position and an extended position. In the retracted position the drive coupler is disengaged from a corresponding drive interface of a first replaceable unit when the first replaceable unit is installed in the image forming device. In the extended position the drive coupler is engaged with the corresponding drive interface of the first replaceable unit when the first replaceable unit is installed in the image forming device for providing a rotational force from the drive coupler to the drive interface of the first replaceable unit. A lever is operatively connected to the drive coupler such that the lever causes the drive coupler to move from the retracted position to the extended position upon the lever receiving an actuation force from insertion of a second replaceable unit that is toward the drive coupler along the axial direction.

An assembly for an electrophotographic image forming device according to another example embodiment includes a rotatable drive coupler movable between a retracted position and an extended position. In the retracted position the drive coupler is disengaged from a corresponding drive interface of an image transfer unit having a rotatable transfer belt that is configured to receive toner images from an image donating member and to transfer the toner images to an image receiving medium. In the extended position the drive coupler is engaged with the corresponding drive interface of the image transfer unit for providing a rotational force from the drive coupler to the drive interface of the image transfer unit to rotate the transfer belt. An actuator is operatively connected to the drive coupler such that the actuator moves the drive coupler from the retracted position to the extended position upon the actuator receiving an actuation force from an insertion of an imaging module configured to hold the image donating member into the image forming device.

A system for an electrophotographic image forming device according to another example embodiment includes an imaging basket insertable into and removable from the image forming device. The imaging basket is configured to hold a plurality of imaging units for forming toner images. An image transfer unit is insertable into and removable from the image forming device. The image transfer unit includes a rotatable transfer belt for receiving the toner images from the plurality of imaging units and a drive interface operatively connected to the transfer belt such that rotation of the drive interface causes rotation of the transfer belt. A rotatable drive coupler mounted in the image forming device is movable between a disengaged position and an engaged position. In the disengaged position the drive coupler is disengaged from the drive interface of the image transfer unit when the image transfer unit is installed in the image forming device. In the engaged position the drive coupler is engaged with the drive interface of the image transfer unit when the image transfer unit is installed in the image forming device for providing a rotational force from the drive coupler to the drive interface of the image transfer unit to rotate the transfer belt for transporting the toner images on the transfer belt to a toner transfer area. An actuator is mounted in the image forming device and operatively connected to the drive coupler such that the actuator moves the drive coupler from the disengaged position to the engaged position upon the actuator receiving an actuation force from insertion of the imaging basket into the image forming device. Conversely, the actuator moves the drive coupler from the engaged position to the disengaged position upon the actuator being disengaged by removal of the imaging basket from the image forming device. In one embodiment, the image transfer unit is insertable into and removable from the image forming device along a first direction and the imaging module is insertable into and removable from the image forming device along a second direction transverse to the first direction.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
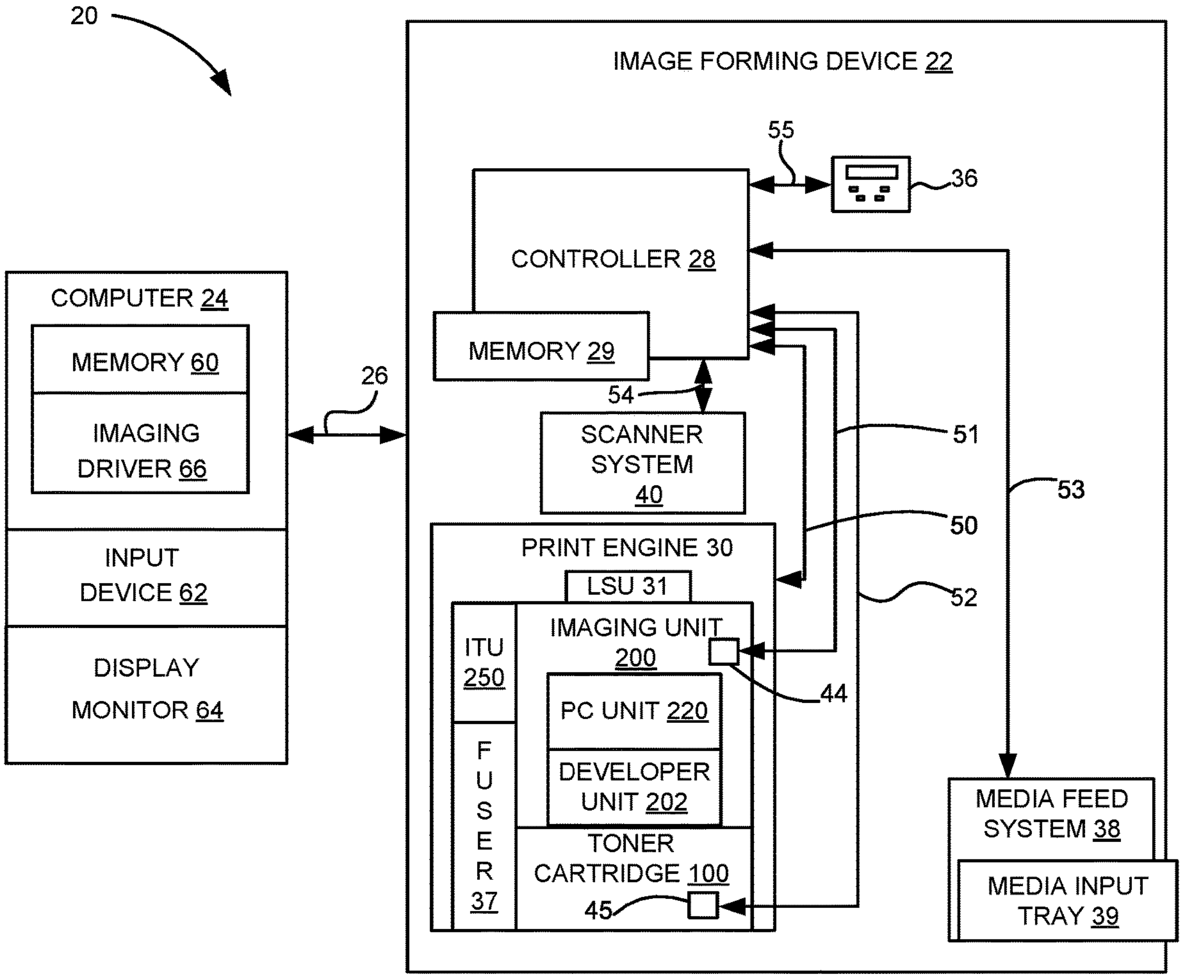
FIG. 1 is a block diagram of an imaging system according to one example embodiment.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, an imaging unit 200, a toner cartridge 100, an image transfer unit (ITU) 250, a user interface 36, a media feed system 38, a media input tray 39 and a scanner system 40. Image forming device 22 may communicate with computer 24 via a standard communication protocol, such as, for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor may include one or more integrated circuits in the form of a microprocessor or central processing unit and may be formed as one or more Application-specific integrated circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with imaging unit 200 and processing circuitry 44 thereon via a communications link 51. Controller 28 communicates with toner cartridge 100 and processing circuitry 45 thereon via a communications link 52. Controller 28 communicates with media feed system 38 via a communications link 53. Controller 28 communicates with scanner system 40 via a communications link 54. User interface 36 is communicatively coupled to controller 28 via a communications link 55. Controller 28 processes print and scan data and operates print engine 30 during printing and scanner system 40 during scanning. Processing circuitry 44, 45 may provide authentication functions, safety and operational interlocks, operating parameters and usage information related to imaging unit 200 and toner cartridge 100, respectively. Each of processing circuitry 44, 45 includes a processor unit and associated electronic memory. As discussed above, the processor may include one or more integrated circuits in the form of a microprocessor or central processing unit and may be formed as one or more Application-specific integrated circuits (ASICs). The memory may be any volatile or non-volatile memory or combination thereof or any memory device convenient for use with processing circuitry 44, 45.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes laser scan unit (LSU) 31, toner cartridge 100, imaging unit 200, ITU 250 and fuser 37, all mounted within image forming device 22. Imaging unit 200 is removably mounted in image forming device 22 and includes a developer unit 202 that houses a toner sump and a toner development system. In one embodiment, the toner development system utilizes what is commonly referred to as a single component development system. In this embodiment, the toner development system includes a toner adder roll that provides toner from the toner sump to a developer roll. A doctor blade provides a metered uniform layer of toner on the surface of the developer roll. In another embodiment, the toner development system utilizes what is commonly referred to as a dual component development system. In this embodiment, toner in the toner sump of developer unit 202 is mixed with magnetic carrier beads. The magnetic carrier beads may be coated with a polymeric film to provide triboelectric properties to attract toner to the carrier beads as the toner and the magnetic carrier beads are mixed in the toner sump. In this embodiment, developer unit 202 includes a magnetic roll that attracts the magnetic carrier beads having toner thereon to the magnetic roll through the use of magnetic fields. Imaging unit 200 also includes a photoconductor (PC) unit 220 that houses photoconductive drum 223 and a waste toner removal system.

Toner cartridge 100 is removably mounted in imaging forming device 22 in a mating relationship with developer unit 202 of imaging unit 200. An outlet port on toner cartridge 100 communicates with an inlet port on developer unit 202 allowing toner to be periodically transferred from toner cartridge 100 to resupply the toner sump in developer unit 202.

ITU 250 is removably mounted in image forming device 22. ITU 250 is configured to receive toner image(s) from one or more photoconductive drum(s) 223 and transport the toner image(s) to a media sheet.

Figure 2:
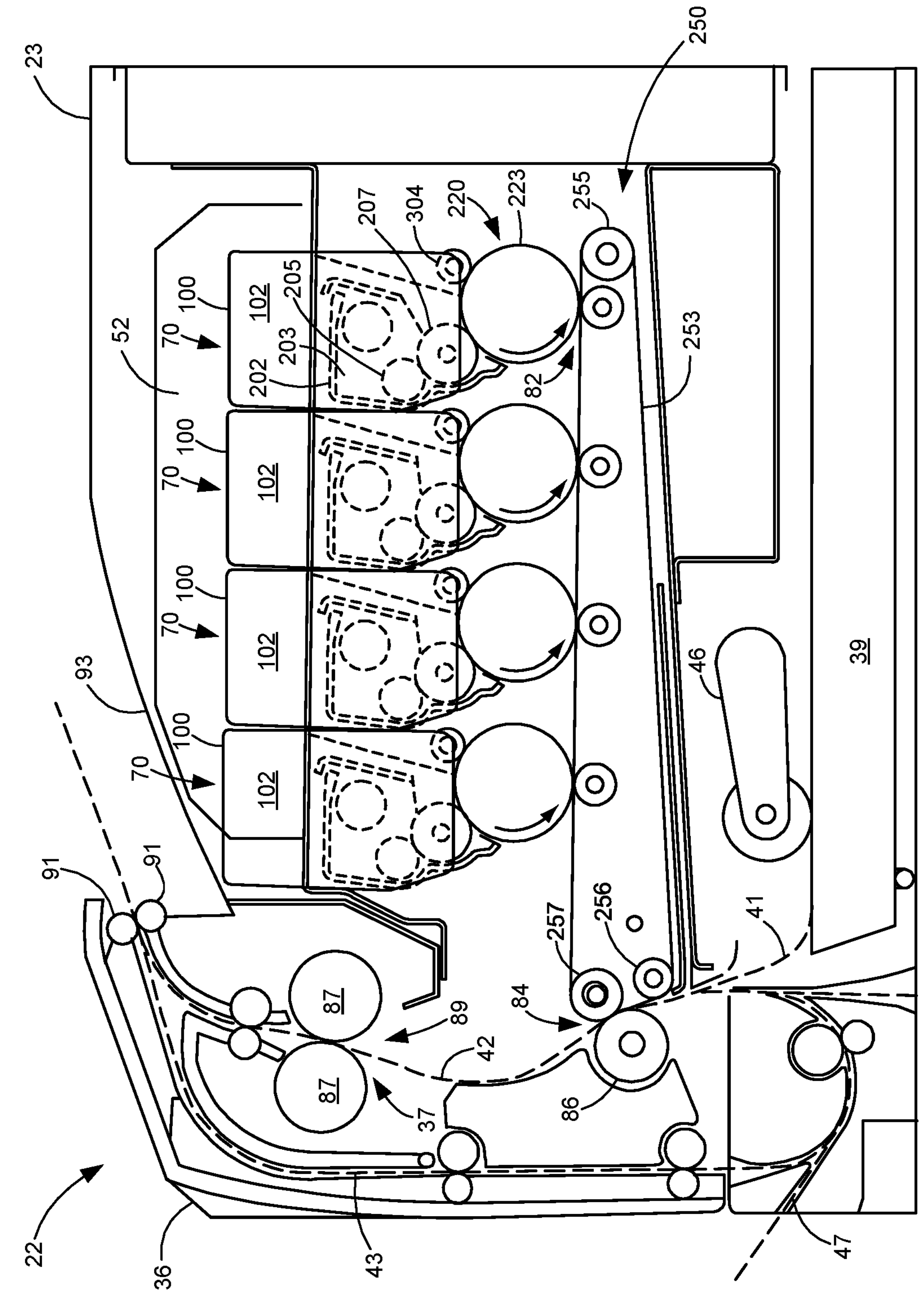
FIG. 2 is a schematic side view of the interior of an image forming device according to one example embodiment.

FIG. 2 illustrates a schematic view of the interior of an example image forming device 22. Image forming device 22 includes a housing 23 including a removable input tray 39 positioned therein. Removable media tray 39 for providing media to be printed may be slidably insertable into image forming device 22. A media output area 93 is provided on housing 23 for collecting printed media exiting image forming device 22. Using the user interface 36, a user is able to enter commands and generally control the operation of the image forming device 22. A media path 41 extends through image forming device 22 for moving the media sheets through the image transfer process. Media path 41 includes a simplex path 42 and may include a duplex path 43. A media sheet is introduced into simplex path 42 from tray 39 by a pick mechanism 46. The media sheet is then moved along media path 41 by various transport rollers. Media sheets may also be introduced into media path 41 by a manual feed 47.

Image forming device 22 includes an image transfer section that includes one or more imaging stations 70. Each imaging station 70 includes a toner cartridge 100 and a developer unit 202 mounted on a common photoconductor unit 220. Each toner cartridge 100 includes a reservoir 102 for holding toner and an outlet port in communication with an inlet port of a corresponding developer unit 202 for transferring toner from reservoir 102 to developer unit 202 as discussed in greater detail below. One or more agitating members may be positioned within reservoir 102 to aid in moving the toner. Each developer unit 202 includes a toner reservoir 203 and a toner adder roll 205 that moves toner from reservoir 203 to a developer roll 207. The photoconductor unit 220 includes a charging roll 304 and a photoconductive (PC) drum 223 for each imaging station 70. PC drums 223 are mounted substantially parallel to each other. For purposes of clarity, developer unit 202, PC drum 223 and charging roll 304 are labeled on only one of the imaging stations 70. In the example embodiment illustrated, each imaging station 70 is substantially the same except for the color of toner.

Each charging roll 304 forms a nip with the corresponding PC drum 223. During a print operation, charging roll 304 charges the surface of PC drum 223 to a specified voltage such as, for example, −1000 volts. A laser beam from LSU 31 associated with each imaging station 70 is then directed to the surface of PC drum 223 and selectively discharges those areas it contacts to form a latent image. In one embodiment, areas on PC drum 223 illuminated by the laser beam are discharged to approximately −300 volts. Developer roll 207, which forms a nip with the corresponding PC drum 223, then transfers toner to PC drum 223 to form a toner image. A metering device such as a doctor blade assembly can be used to meter toner onto developer roll 207 and apply a desired charge on the toner prior to its transfer to PC drum 223. The toner is attracted to the areas of PC drum 223 surface discharged by the laser beam from LSU 31.

ITU 250 is disposed adjacent to imaging stations 70. In this embodiment, ITU 250 includes an endless transfer belt 253 trained about a drive roll 255, a tension roll 256 and a back-up roll 257. During image forming operations, transfer belt 253 moves past imaging stations 70 in a clockwise direction as viewed in FIG. 2. One or more of PC drums 223 apply toner images in their respective colors to transfer belt 253 at a first transfer nip 82. In one embodiment, a positive voltage field attracts the toner image from PC drums 223 to the surface of the moving transfer belt 253. Transfer belt 253 rotates and collects the one or more toner images from imaging stations 70 and then conveys the toner images to a media sheet at a second transfer nip 84 formed between a transfer roll 86 and transfer belt 253, which is supported by back-up roll 257.

A media sheet advancing through simplex path 42 receives the toner image from ITU 250 as it moves through the second transfer nip 84. The media sheet with the toner image is then moved along the media path 41 and into a fuser area 37. Fuser area 37 includes fusing rolls or belts 87 that form a nip 89 to adhere the toner image to the media sheet. The fused media sheet then passes through exit rolls 91 that are located downstream from the fuser area 37. Exit rolls 91 may be rotated in either forward or reverse directions. In a forward direction, the exit rolls 91 move the media sheet from simplex path 42 to output area 93 of image forming device 22. In a reverse direction, exit rolls 91 move the media sheet into duplex path 43 for image formation on a second side of the media sheet.

While the example image forming device 22 shown in FIG. 2 utilizes a single component development system, in another embodiment, image forming device 22 utilizes what is commonly referred to as a dual component development system. In this embodiment, reservoir 203 of developer unit 202 stores a mixture of toner and magnetic carrier beads. The carrier beads may be coated with a polymeric film to provide triboelectric properties to attract toner to the carrier beads as the toner and the carrier beads are mixed in reservoir 203. Each developer unit 202 also includes a magnetic roll that attracts the carrier beads in reservoir 203 having toner thereon to the magnetic roll through the use of magnetic fields and transports the toner to the corresponding PC drum 223. Electrostatic forces from the latent image on PC drum 223 strip the toner from the carrier beads to form a toner image on the surface of PC drum 223. PC drum 223 is charged by charge roll 304 and cleaned by a cleaner blade/roll.

Figure 3:
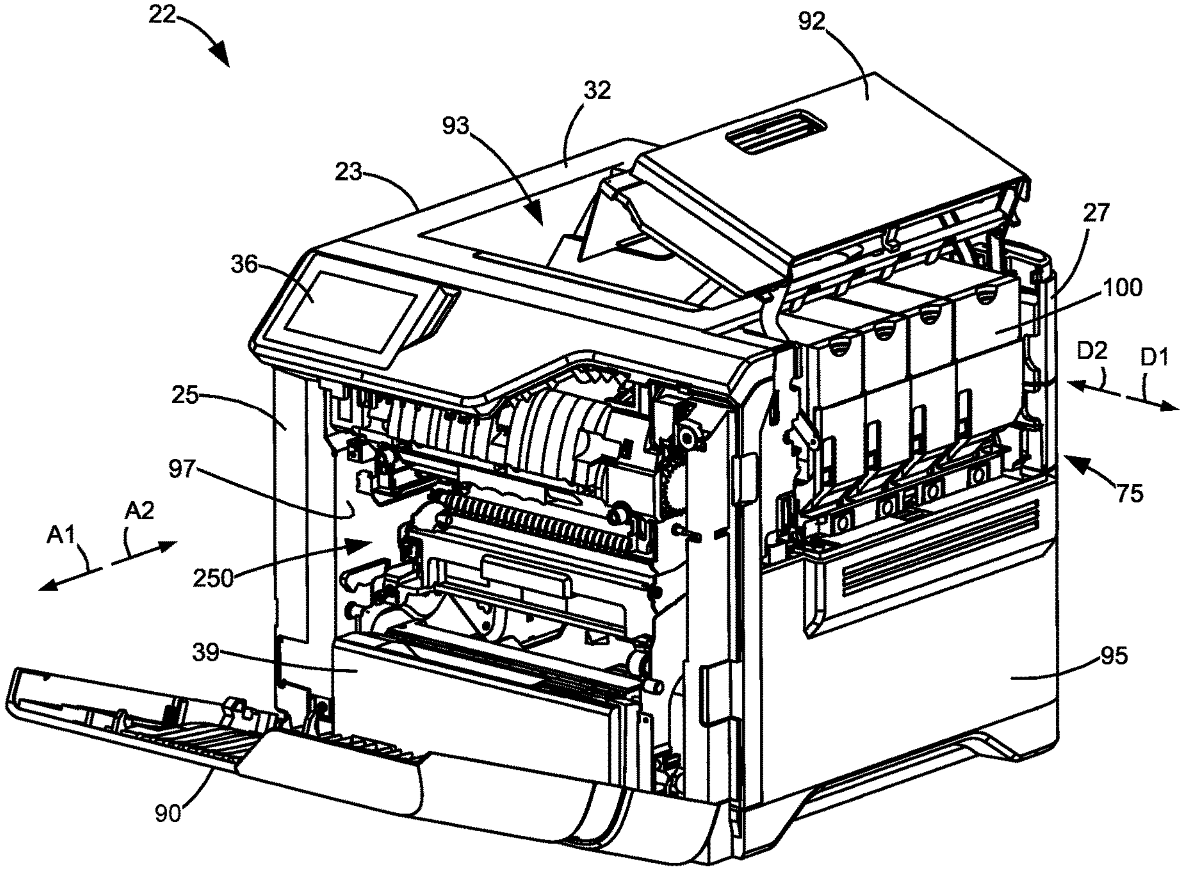
FIG. 3 is a perspective view of an image forming device with a front access door and a side access door of the image forming device opened exposing a replaceable image transfer unit and a replaceable imaging module, respectively, according to one example embodiment.
Figure 4:
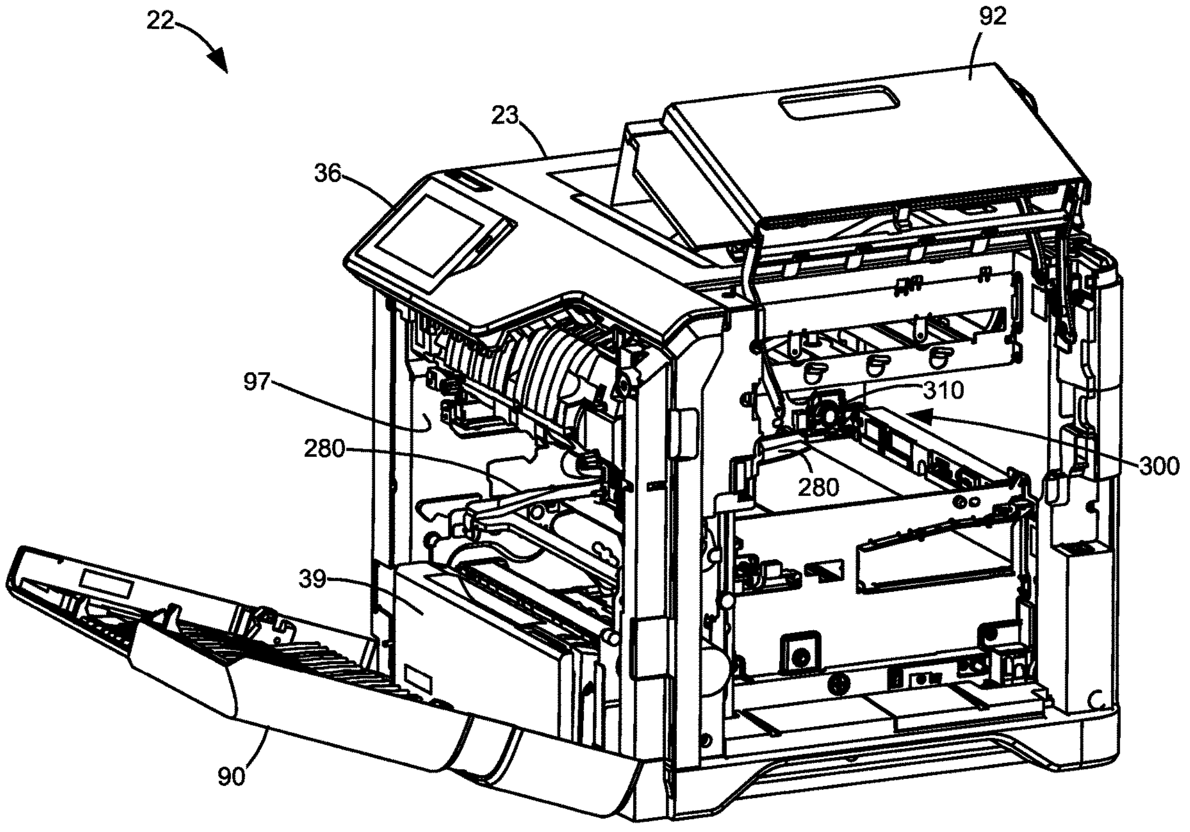
FIG. 4 is a perspective view of the image forming device shown in FIG. 3 with the image transfer unit, the imaging module and a waste toner container removed to expose a drive system for the image transfer unit according to one example embodiment.

FIGS. 3 and 4 illustrate an example embodiment of image forming device 22 having housing 23. A front access door 90 is positioned on a front 25 of housing 23 and a side access door 92 is positioned on a side 27 of housing 23. FIG. 3 shows image forming device 22 with each of front access door 90 and side access door 92 in an open position with an imaging module 75 and ITU 250 installed in image forming device 22. In this embodiment, imaging module 75 generally includes toner cartridges 100 and imaging units 200 as well as features that hold and support toner cartridges 100 and imaging units 200 to allow toner cartridges 100 and imaging units 200 to be inserted into and removed from image forming device 22 as a single unit. For example, imaging module 75 may include an imaging basket that holds a plurality of imaging units and/or a plurality of toner cartridges. A waste toner container 95 is positioned on side 27 where waste toner from each photoconductor unit 220 is collected. Media output area 93 is provided on top 32 of housing 23 for collecting printed media exiting image forming device 22. User interface 36 is positioned on front 25 of housing 23. Removable media tray 39 for providing media to be printed may be slidably insertable into image forming device 22.

In the open position, each of front access door 90 and side access door 92 permits access to interior components of image forming device 22 and allows the insertion and removal of imaging module 75 and ITU 250. In an example embodiment, ITU 250 is removable from and insertable into image forming device 22 along a first direction and imaging module 75 is removable from and insertable into image forming device 22 along a second direction different from the first direction. In the embodiment illustrated, ITU 250 is removable from and insertable into image forming device 22 along directions A1, A2, respectively, and imaging module 75 is removable from and insertable into image forming device 22 along directions D1, D2, respectively. To remove ITU 250 from image forming device 22, waste toner container 95 is first removed from image forming device 22 and imaging module 75 is slidably removed from side 27 of housing 23 in direction D1. ITU 250 is then slidably removed from front 25 of housing 23 in direction A1. The above sequence is reversed when installing ITU 250 and imaging module 75 into image forming device 22. In particular, ITU 250 is first slidably inserted from front 25 of housing 23 into image forming device 22 in direction A2, and then imaging module 75 and waste toner container 95 are inserted from side 27 of housing 23 into image forming device 22 in direction D2. In the embodiment illustrated, the direction of insertion and removal of imaging module 75 along direction D1-D2 is transverse to the direction of insertion and removal of ITU 250 along direction A1-A2.

FIG. 4 shows image forming device 22 with front access door 90 and side access door 92 in their respective open positions and imaging module 75, waste toner container 95 and ITU 250 removed from image forming device 22 to expose a drive system 300 mounted internal to image forming device 22 on an inner side 97 thereof. Drive system 300 is shown having a drive coupler 310 positioned on an inner side 97 of image forming device 22 to engage and provide rotational force to a corresponding drive interface 260 (FIG. 6) of ITU 250 when ITU 250 is installed in image forming device 22. Drive interface 260 of ITU 250 drives various rotatable components, such as drive roll 255, backup roll 257, and/or tension roll 256 of ITU 250. To engage with drive system 300, ITU 250 is inserted from front 25 of housing 23 into image forming device 22 until drive interface 260 of ITU 250 is aligned with corresponding drive coupler 310 of drive system 300, and then an actuation force from the insertion of imaging module 75 from side 27 of housing 23 into image forming device 22 is provided to move drive coupler 310 into mating engagement with drive interface 260 of ITU 250 as discussed in greater detail below. The inner side 97 of image forming device 22 includes a guide rail assembly 280 that aids in the insertion of ITU 250 into image forming device 22. For example, as ITU 250 is inserted into image forming device 22, an alignment guide of ITU 250 travels along guide rail assembly 280. The opposite side of front 25 of housing 23 that receives ITU 250 (opposite inner side 97) may include a similar guide rail to aid in the insertion of ITU 250 into image forming device 22.

Figure 5:
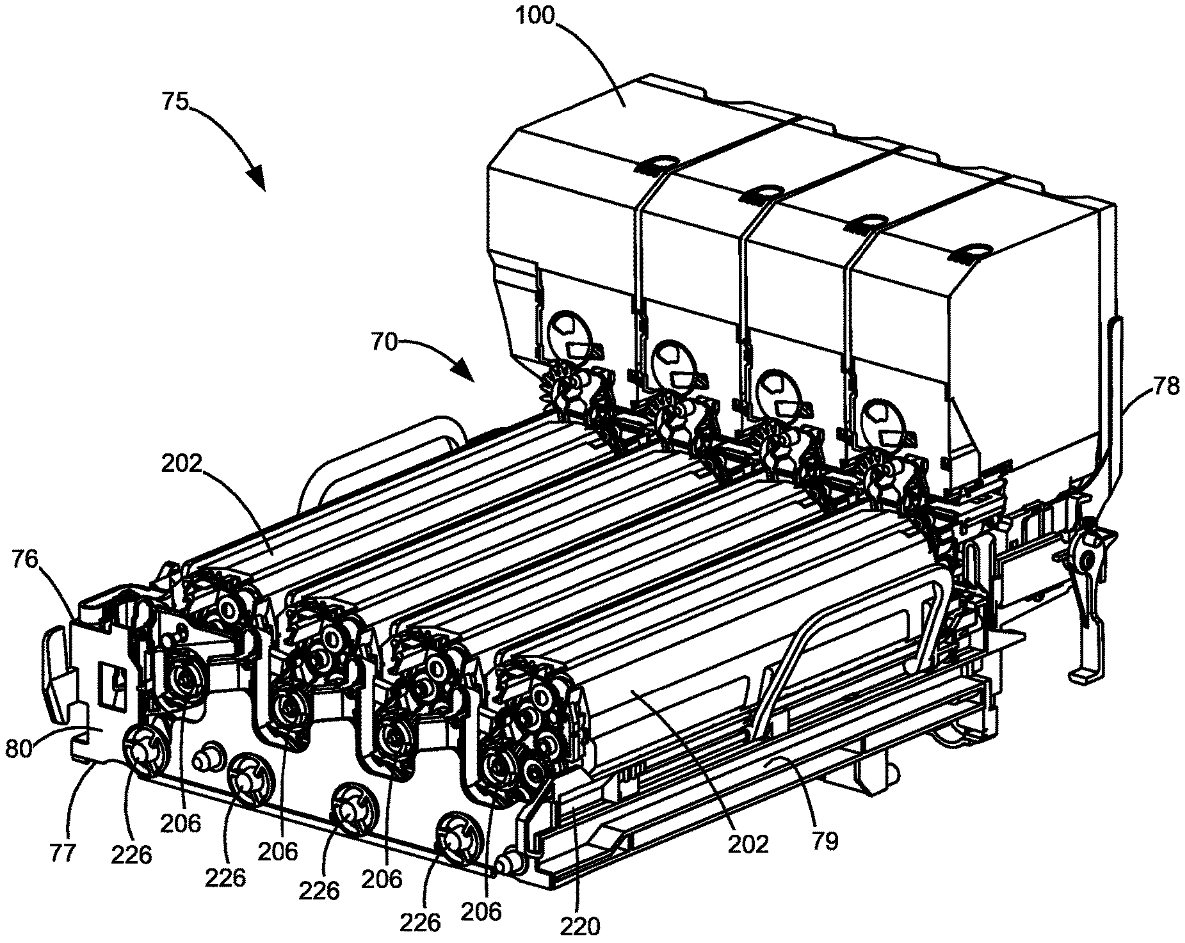
FIG. 5 is a perspective view of the imaging module shown in FIG. 3.

FIG. 5 illustrates imaging module 75 that holds imaging stations 70 according to one example embodiment. In the embodiment illustrated, imaging module 75 includes a set of four imaging stations 70 that each includes a respective toner cartridge 100, developer unit 202, and photoconductor unit 220 mounted in a frame 76. In the example embodiment illustrated, imaging module 75 includes four cradles 78 that each hold a respective toner cartridge 100 and four positioning slots that each hold a respective developer unit 202. Each toner cartridge 100 includes an outlet port for transferring toner to developer unit 202 through an inlet port of developer unit 202. Toner cartridges 100 and developer units 202 are separately removable from imaging module 75 in order to permit replacement of each toner cartridge 100 and developer unit 202 individually. Photoconductor units 220 may be removable from imaging module 75 or fixed thereto. In the example embodiment illustrated, the photoconductor unit 220 of each imaging station 70 is fixed to and removable with imaging module 75. Imaging module 75 includes opposed alignment guides 79 that travel along corresponding guide slots in image forming device 22 to assist in the insertion and removal of imaging module 75 into and out of image forming device 22. Frame 76 includes a frame plate 77 having an engagement surface 80 that is positioned to engage and disengage a portion of drive system 300 to move drive coupler 310 relative to drive interface 260 of ITU 250 when imaging module 75 is removed from and inserted into image forming device 22, as discussed in greater detail below.

Imaging module 75 includes a plurality of drive couplers 206, 226 positioned to engage and receive rotational force from corresponding drive couplers of drive system 300 in image forming device 22 when imaging module 75 is installed in image forming device 22 to drive rotatable components of developer unit 202 and photoconductor unit 220, respectively. Drive system 300 may include one or more drive motors and a drive transmission from the drive motor(s) to drive couplers that mate with corresponding drive couplers 206, 226 of imaging module 75 when imaging module 75 is installed in image forming device 22. Drive coupler 206 is operatively connected (either directly or indirectly through one or more intermediate gears) to rotatable components of developer unit 202 including, for example, developer roll 207 and toner adder roll 205, to rotate developer roll 207 and toner adder roll 205 upon receiving rotational force from drive system 300 in image forming device 22. Drive coupler 226 is operatively connected (either directly or indirectly through one or more intermediate gears) to photoconductive drum 223 to rotate photoconductive drum 223 upon receiving rotational force from drive system 300 in image forming device 22. In some embodiments, charge roll 304 is driven by friction contact between the surfaces of charge roll 304 and photoconductive drum 223. In other embodiments, charge roll 304 is connected to drive coupler 226 by one or more gears.

Figure 6:
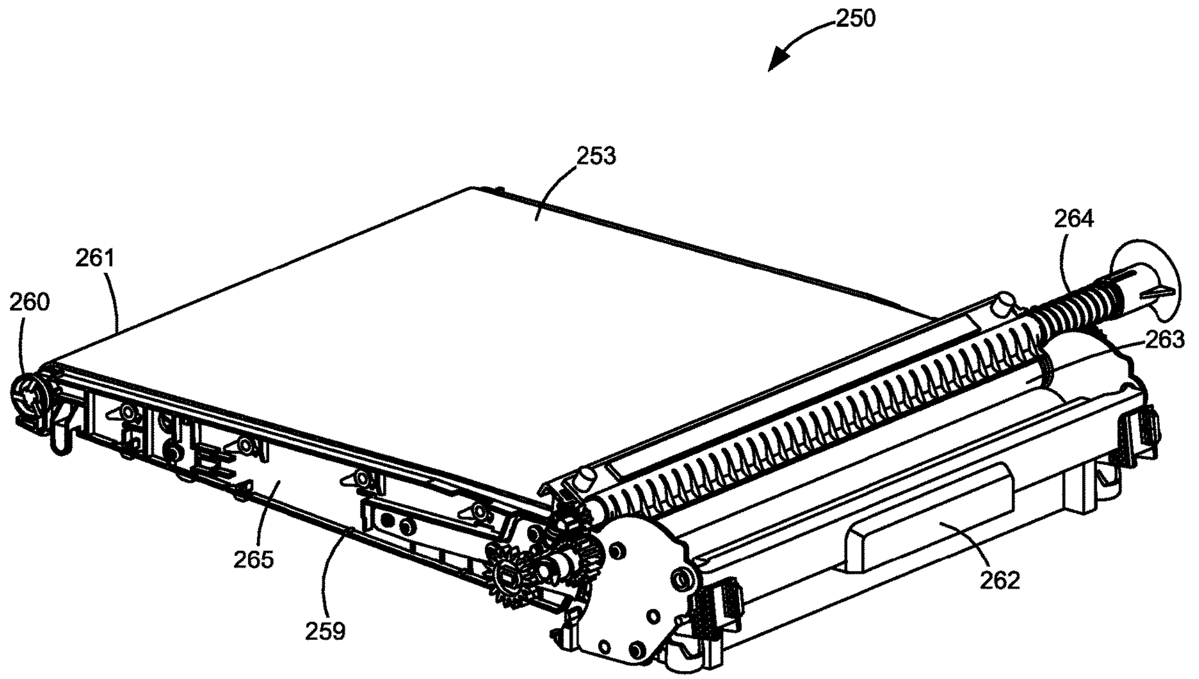
FIG. 6 is a perspective view of the image transfer unit shown in FIG. 3.

FIG. 6 illustrates an example embodiment of ITU 250 in which transfer belt 253 is disposed. In the embodiment illustrated, ITU 250 includes a frame 259 and a handle 262 to assist with insertion and removal of ITU 250 into and out of image forming device 22. Transfer belt 253 is disposed around back-up roll 257, drive roll 255 and tension roll 256 (which are thus obscured from view by transfer belt 253 in FIG. 6) so as to be rotatably engaged therewith. In this embodiment, drive roll 255 is disposed at a back end 261 of frame 259, and tension roll 256 and back-up roll 257 are disposed at a front end 263 of frame 259. In an example embodiment, drive roll 255 is a driven roll such that rotation of drive roll 255 causes at least back-up roll 257 and tension roll 256 to rotate about their respective axes and transfer belt 253 to rotate. ITU 250 further includes a cleaning unit 264 which is disposed at the front end 263 of frame 259. Cleaning unit 264 includes a blade (not shown) which contacts transfer belt 253 to remove residual toner therefrom. Cleaning unit 264 may also include an interior space for collecting the residual toner that is removed by the blade of cleaning unit 264 and an auger for moving the collected residual toner to waste toner container 95. The blade of cleaning unit 264 contacts transfer belt 253 at a location adjacent to the location of back-up roll 257. In this way, back-up roll 257 provides a surface against which the blade of cleaning unit 264 may indirectly contact to ensure effective removal of residual toner from transfer belt 253. Drive interface 260, which may be a gear or other form of drive coupler, is positioned on side 265 of frame 259. In the embodiment illustrated, drive interface 260 is shown as a drive coupler that is positioned to engage drive coupler 310 of drive system 300 in image forming device 22 when ITU 250 is installed therein in order to receive rotational power for rotating various components of ITU 250. In one embodiment, drive interface 260 is connected to drive roll 255 such that rotating drive interface 260 rotates drive roll 255 and, consequently, tension roll 256 and transfer belt 253.

Figure 7:
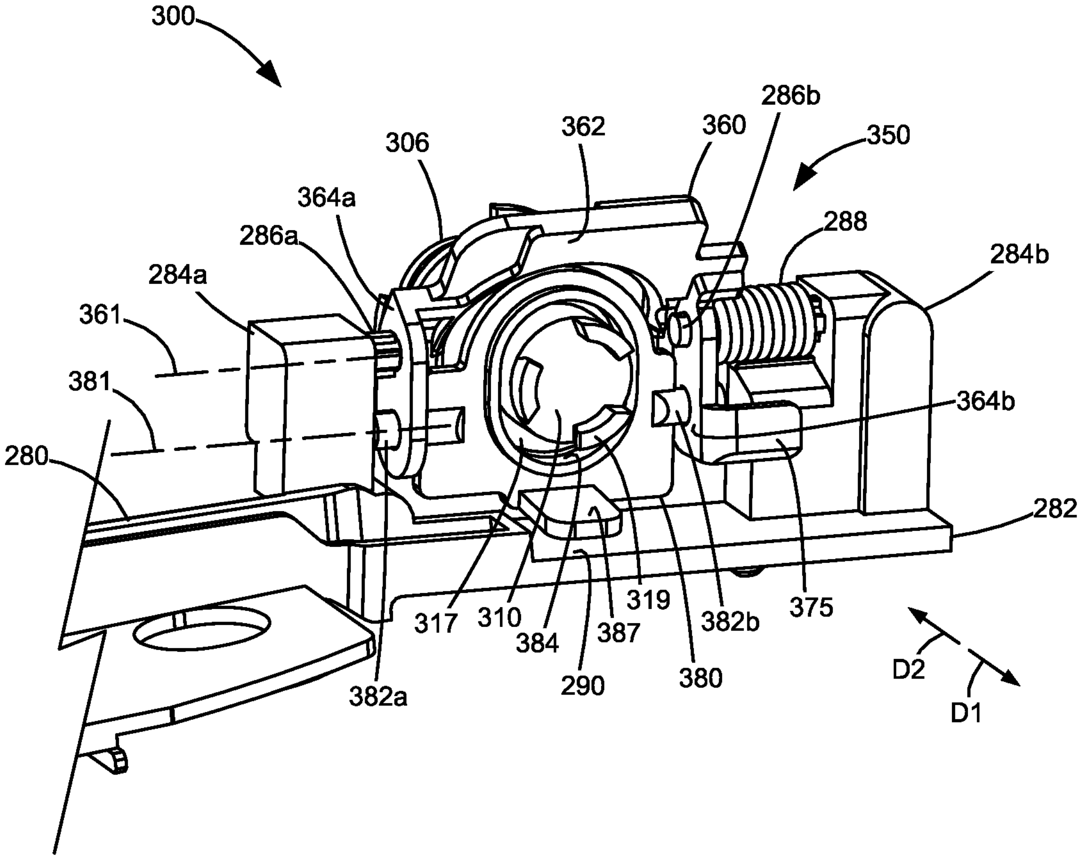
FIG. 7 is a perspective view of the drive system including a drive coupler and a retraction mechanism for the drive coupler according to one example embodiment.
Figure 8A:
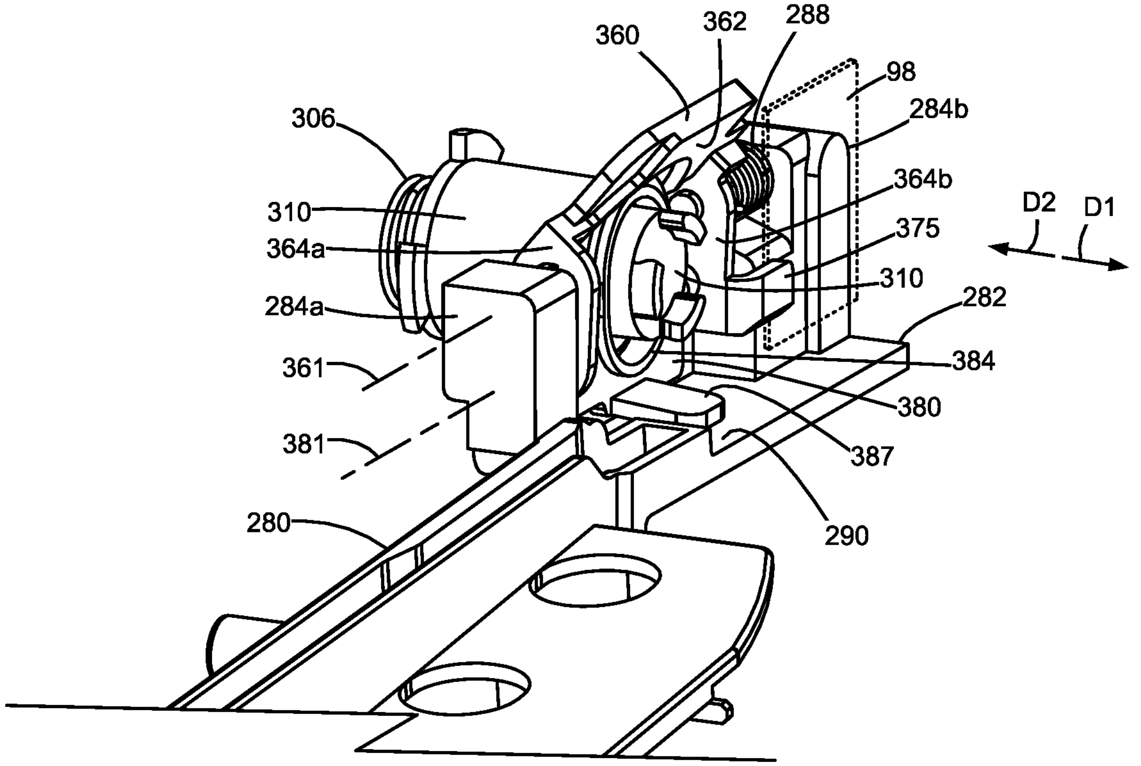
FIGS. 8A and 8B are perspective views of the drive system with the drive coupler in a retracted position and an extended position, respectively, according to one example embodiment.
Figure 8B:
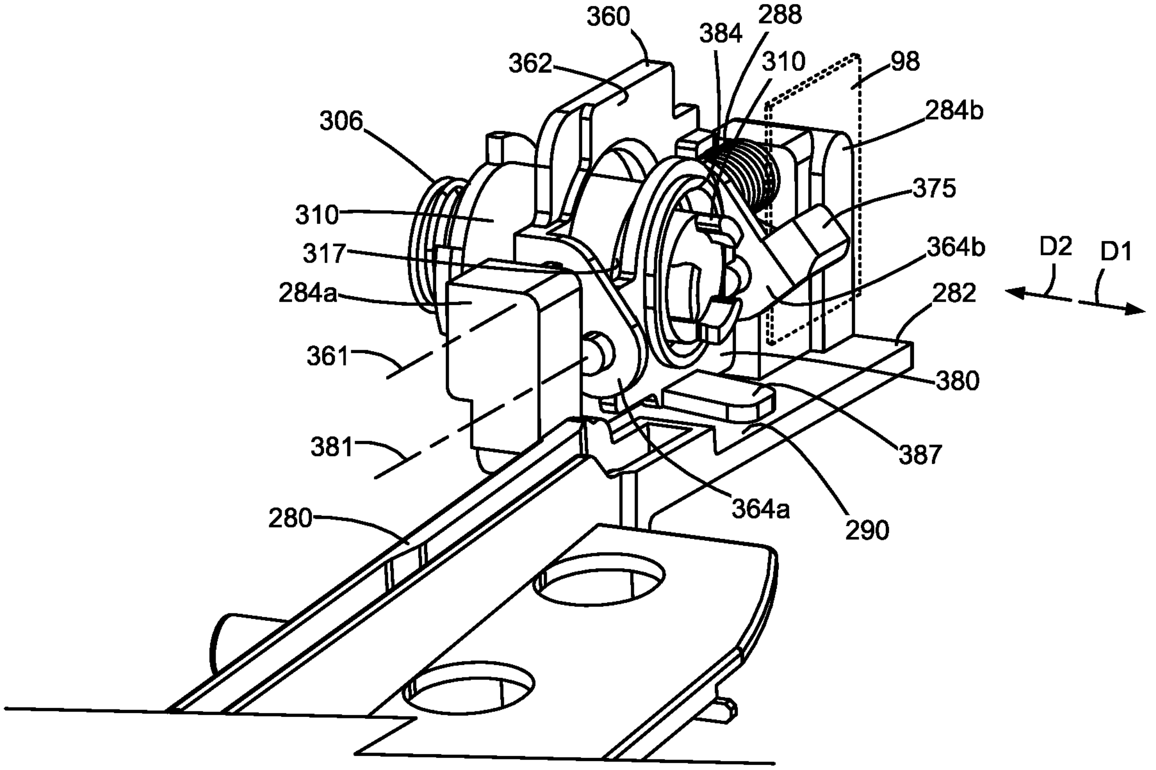

With reference to FIGS. 7-8B, drive system 300 in image forming device 22 is illustrated according to an example embodiment. Drive system 300 includes drive coupler 310 that provides rotational motion from an electric motor in image forming device 22 to drive interface 260 of ITU 250. In this example embodiment, drive coupler 310 provides rotational power to rotate drive roll 255 via drive interface 260 of ITU 250. Drive coupler 310 of drive system 300 is movable between a retracted position shown in FIG. 8A and an extended position shown in FIG. 8B. In the retracted position, drive coupler 310 is disengaged from drive interface 260 of ITU 250. In the extended position, drive coupler 310 is in an operational position engaged with drive interface 260 of ITU 250 when ITU 250 and imaging module 75 are installed in image forming device 22 for transferring rotational force from drive coupler 310 to drive interface 260.

Image forming device 22 includes a retraction mechanism 350 mounted on inner side 97 of image forming device 22. In the embodiment illustrated, retraction mechanism 350 is located at a distal end 282 of guide rail assembly 280. Retraction mechanism 350 is engageable and movable by imaging module 75 upon insertion of imaging module 75 into image forming device 22. Retraction mechanism 350 is operatively connected to drive coupler 310 such that retraction mechanism 350 causes drive coupler 310 to move from the retracted position to the extended position upon retraction mechanism 350 receiving an actuation force from the insertion of imaging module 75 into image forming device 22. Removal of imaging module 75 from image forming device 22 disengages imaging module 75 from retraction mechanism 350 thereby removing the actuation force acting on retraction mechanism 350 and returning drive coupler 310 from the extended position to the retracted position. This allows ITU 250 to be installed in and removed from image forming device 22 without being obstructed by drive coupler 310.

Figure 9:
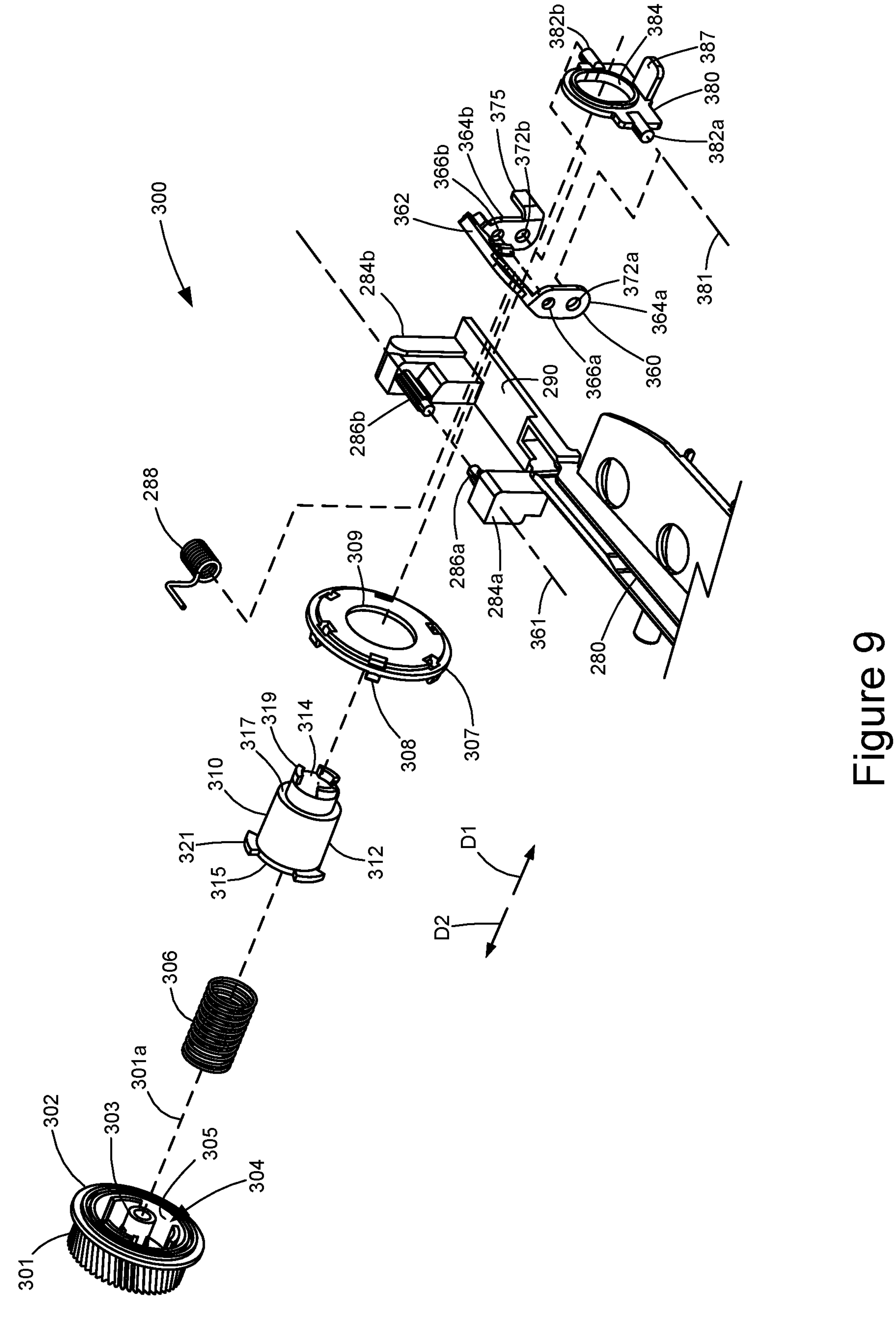
FIG. 9 is an exploded view of the drive system and the retraction mechanism shown in FIGS. 7-8B.

FIG. 9 illustrates an exploded view of drive system 300 and retraction mechanism 350. With reference to FIGS. 7-9, in the embodiment illustrated, drive system 300 includes an input drive gear 301 having an axis of rotation 301*a*. Input drive gear 301 is operatively connected to an electric motor in image forming device 22 that provides rotational motion to input drive gear 301. Input drive gear 301 is coupled to drive coupler 310 such that drive coupler 310 rotates when input drive gear 301 rotates. In the embodiment illustrated, drive coupler 310 includes a sleeve 312 having a first end 314, a second end 315, and a ledge surface 317 therebetween. First end 314 of sleeve 312 is configured to mate with drive interface 260 of ITU 250. In the embodiment illustrated, sleeve 312 includes one or more drive elements on first end 314 such as, for example, drive lugs 319 extending outward therefrom and positioned to mate with drive interface 260 of ITU 250. Second end 315 of sleeve 312 is operatively connected to input drive gear 301 such that torque is transferred to sleeve 312 when input drive gear 301 is rotated.

In the example embodiment illustrated, second end 315 of sleeve 312 is sized to be received into a cavity 304 formed on input drive gear 301. One or more retention lugs 321 on second end 315 of sleeve 312 extend radially outward therefrom and are positioned to align with and be inserted into corresponding axial channels 305 within cavity 304 of input drive gear 301 to allow sleeve 312 to be rotated when input drive gear 301 is rotated. A biasing member, such as a compression spring 306, is positioned between input drive gear 301 and sleeve 312. In the example embodiment illustrated, cavity 304 includes a spring post 303 for locating compression spring 306 between input drive gear 301 and sleeve 312. Compression spring 306 is compressed within cavity 304 of input drive gear 301 and a central hollow portion (not shown) of rear end 314 of sleeve 312 in order to continuously bias sleeve 312 of drive coupler 310 axially outward, away from input drive gear 301 and toward drive interface 260 of ITU 250. A retention collar 307 is used to secure sleeve 312 to input drive gear 301 upon assembly. In the embodiment illustrated, retention collar 307 is fastened to input drive gear 301, such as by using hooks 308 that are snap-fitted into an outer ring 302 of input drive gear 301. A center opening 309 of retention collar 307 is sized to allow sleeve 312 to pass through center opening 309 but obstruct retention lugs 321 of sleeve 312 to prevent sleeve 312 from being decoupled from input drive gear 301.

Retraction mechanism 350 includes an actuator lever 360 and an actuator collar 380 mounted to actuator lever 360. In the embodiment illustrated, actuator lever 360 includes an engagement member 362 and a pair of extension arms 364*a*, 364*b* extending at an angle from engagement member 362. In the example embodiment illustrated, actuator lever 360 is pivotable about a pivot axis 361 between opposed arms 284*a*, 284*b* extending from distal end 282 of guide rail assembly 280. Pivot posts 286*a*, 286*b*, which extend from opposed arms 284*a*, 284*b* of guide rail assembly 280 into corresponding holes 366*a*, 366*b* of extension arms 364*a*, 364*b* of actuator lever 360, define pivot axis 361 of actuator lever 360. Actuator collar 380 is pivotably mounted to actuator lever 360 about a pivot axis 381 between extension arms 364*a*, 364*b* of actuator lever 360. In the embodiment illustrated, actuator collar 380 includes a pair of trunnions 382*a*, 382*b* that are received within corresponding trunnion openings 372*a*, 372*b* formed on extension arms 364*a*, 364*b* of actuator lever 360.

Actuator lever 360 is positioned to rotate in response to removal and insertion of imaging module 75 and move actuator collar 380 along direction D1-D2. In the embodiment illustrated, engagement member 362 of actuator lever 360 is positioned to be engageable by engagement surface 80 of frame plate 77 of imaging module 75 upon insertion of imaging module 75 into its operating position within image forming device 22. Conversely, removal of imaging module 75 from image forming device 22 disengages engagement surface 80 of frame plate 77 of imaging module 75 from engagement member 362 of actuator lever 360. Actuator lever 360 is continuously biased by a biasing member, such as a torsion spring 288 mounted on pivot post 286B, to rotate actuator lever 360 in a direction that moves engagement member 362 in direction D1 towards ITU 250 and away from inner side 97 of image forming device 22.

In the embodiment illustrated, actuator lever 360 includes a stop arm 375 that extends from extension arm 364B of actuator lever 360. Stop arm 375 is positioned to limit rotation of actuator lever 360. In this example, retraction mechanism 350 is located on guide rail assembly 280. Before guide rail assembly 280 and retraction mechanism 350 are assembled into image forming device 22, retraction mechanism 350 is initially mounted to opposed arms 284*a*, 284*b* of guide rail assembly 280. The biasing force of torsion spring 288 causes stop arm 375 of actuator lever 360 to rotate and engage arm 284*b* of guide rail assembly 280 thereby limiting the rotation of actuator lever 360 and actuator collar 380. Thus, arm 284B of guide rail assembly 280 serves as a rotational stop to limit rotation of actuator lever 360 prior to assembly of guide rail assembly 280 and retraction mechanism 350 into image forming device 22. When guide rail assembly 280 and retraction mechanism 350 are assembled into their operational positions within image forming device 22, a side frame portion 98 (illustrated in phantom lines in FIGS. 8A and 8B) in inner side 97 of image forming device 22 is positioned between arm 284B of guide rail assembly 280 and stop arm 375 of actuator lever 360 such that side frame portion 98 becomes the rotational stop of actuator lever 360 during actual operation of retraction mechanism 350.

Actuator collar 380 is positioned to facilitate axial movement of drive coupler 310 between the extended position and the retracted position. In the embodiment illustrated, actuator collar 380 has a center opening 384 that is sized to receive and allow first end 314 of drive coupler 310 to pass through but obstruct ledge surface 317. In the embodiment shown, center opening 384 of actuator collar 380 is shaped to allow slight vertical movement of drive coupler 310 when drive coupler 310 moves axially between the extended position and the retracted position. Due to the biasing force provided by compression spring 306 on drive coupler 310, ledge surface 317 of drive coupler 310 is axially biased in direction D1 against actuator collar 380. In this embodiment, the biasing force exerted by torsion spring 288 on actuator lever 360 causes actuator collar 380 to exert an axial biasing force in direction D2 against ledge surface 317 of drive coupler 310 that is greater than an axial biasing force exerted by ledge surface 317 of drive coupler 310 against actuator collar 380 in direction D1. As a result, actuator lever 360 and actuator collar 380 holds drive coupler 310 in the retracted position against the biasing force of compression spring 306 in the absence of an actuation force acting on actuator lever 360. Movement of engagement member 362 of actuator lever 360 in direction D2 toward inner side 97 of image forming device 22, such as when the biasing force of torsion spring 288 is overcome upon engagement member 362 receiving an actuation force from the insertion of imaging module 75, causes actuator collar 380 to move in direction D1 away from inner side 97 of image forming device 22 which, in turn, allows the biasing force of compression spring 306 acting on drive coupler 310 to move drive coupler 310 in direction D1 from the retracted position to the extended position as discussed below.

Actuator collar 380 includes a tab 387 extending from actuator collar 380. In the embodiment illustrated, tab 387 is positioned to limit rotation of actuator collar 380 when actuator lever 360 rotates about its pivot axis 361 and moves actuator collar 380. When imaging module 75 is not installed and drive coupler 310 is in the retracted position, tab 387 contacts a bottom surface 290 of guide rail assembly 280 to limit rotation of actuator collar 380 and keep actuator collar 380 in an upright position. In particular, in the embodiment illustrated, the spring force of torsion spring 288 acting on actuator collar 380 is located above pivot axis 381 of actuator collar 380 which tends to rotate actuator collar 380 downward toward bottom surface 290. With tab 387 of actuator collar 380, actuator collar 380 is kept upright as tab 387 touches bottom surface 290 of guide rail assembly 280. When imaging module 75 is installed in image forming device 22 and drive coupler 310 is in the extended position, tab 387 contacts a portion of side 265 of ITU 250 near back end 261 of its frame 259 to limit rotation of actuator collar 380 and prevent actuator collar 380 from rubbing against drive coupler 310. In this position, actuator collar 380 is free from contact with drive coupler 310 allowing the biasing force of compression spring 306 to urge drive coupler 310 against drive interface 260 of ITU 250. In particular, when drive coupler 310 is pushed against drive interface 260 of ITU 250 when imaging module 75 is fully inserted into image forming device 22, tab 387 of actuator collar 380 is biased into contact with frame 259 of ITU 250 to limit rotation of actuator collar 380 while ledge surface 317 of drive coupler 310 is spaced away from actuator collar 380 such that actuator collar 380 is free from contact with ledge surface 317 of drive coupler 310. In this manner, actuator lever 360 and actuator collar 380 are operatively disengaged or disconnected from drive coupler 310 when drive coupler 310 is engaged with drive interface 260 of ITU 250 such that there is no side-loading on drive coupler 310 by actuator collar 380 and actuator collar 380 is prevented from rubbing against drive coupler 310 when drive coupler 310 rotates.

Figure 10A:
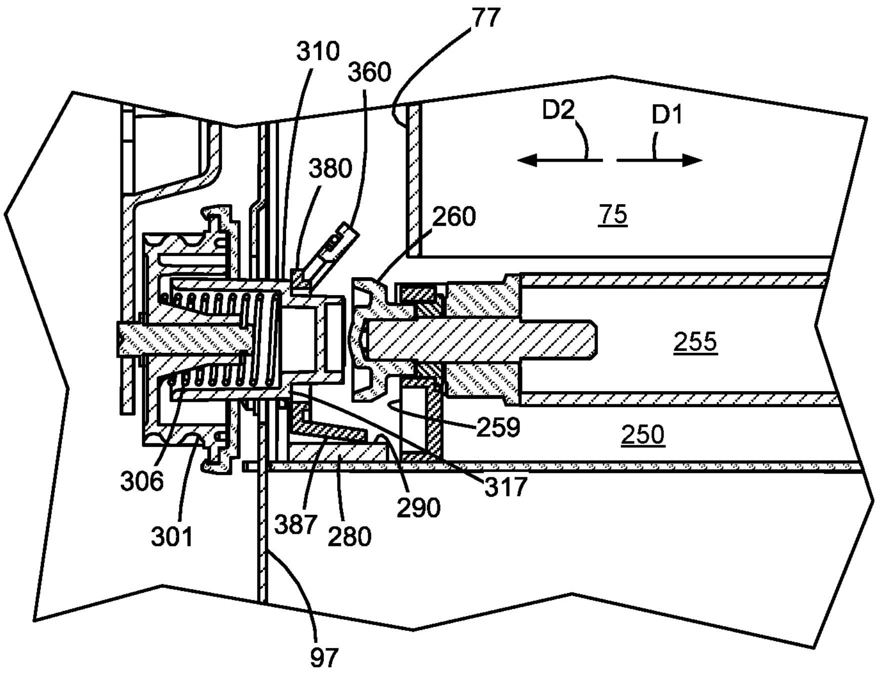
FIGS. 10A and 10B are side cross-sectional views of the drive system and the image transfer unit with the drive coupler in the retracted position and the extended position, respectively, according to one example embodiment.
Figure 10B:
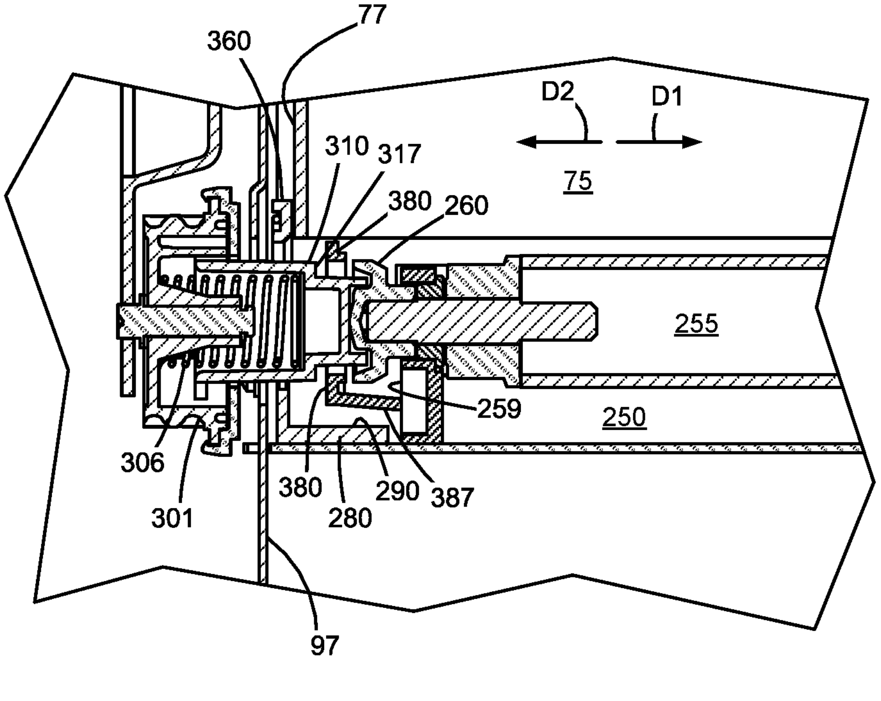

FIGS. 10A and 10B illustrate cross-sectional views of retraction mechanism 350 when ITU 250 is installed in image forming device 22 with imaging module 75 partially inserted into image forming device 22 in FIG. 10A and imaging module 75 fully inserted into image forming device in FIG. 10B. In the absence of imaging module 75 or upon initial insertion of imaging module 75 into image forming device 22 as shown in FIG. 10A, retraction mechanism 350 is disengaged from frame plate 77 of imaging module 75. Due to the biasing force provided by torsion spring 288 on actuator lever 360 which pushes engagement member 362 in direction D1 and because actuator collar 380 is mounted to actuator lever 360 at a location below pivot axis 361 of actuator lever 360, actuator collar 380 is continuously biased by torsion spring 288 in direction D2 away from ITU 250 and towards inner side 97 of image forming device 22. With compression spring 306 axially biasing drive coupler 310 in direction D1 towards ITU 250 and torsion spring 288 biasing actuator collar 380 in direction D2 towards inner side 97 of image forming device 22, actuator collar 380 and ledge surface 317 of drive coupler 310 are biased into contact against each other. As discussed above, the biasing force from torsion spring 288 acting on actuator collar 380 is greater than the biasing force from compression spring 306 acting on drive coupler 310 such that a net force acting on drive coupler 310 axially biases drive coupler 310 in the retracted position in the absence of an actuation force acting on actuator lever 360 of retraction mechanism 350. Thus, the biasing force of torsion spring 288 acting on actuator lever 360 in retraction mechanism 350 overcomes the biasing force of compression spring 306 acting on drive coupler 310 of drive system 300 so that actuator collar 380 and actuator lever 360 of retraction mechanism 350 holds drive coupler 310 in the retracted position as shown in FIG. 10A when imaging module 75 is disengaged from retraction mechanism 350. In the retracted position, drive coupler 310 is disengaged from drive interface 260 of ITU 250. Tab 387 of actuator collar 380 contacts bottom surface 290 of guide rail assembly 280 to keep actuator collar 380 upright while drive coupler 310 is in the retracted position.

When imaging module 75 is inserted into image forming device 22, frame plate 77 of imaging module 75 pushes engagement member 362 of actuator lever 360 in direction D2 and causes actuator lever 360 to rotate counterclockwise as viewed in FIG. 10B, overcoming the biasing force of torsion spring 288 and causing actuator collar 380 to move in direction D1. Movement of actuator collar 380 in direction D1, in turn, causes drive coupler 310 to move in direction D1 from the retracted position to the extended position as shown in FIG. 10B as a result of the axial bias applied by compression spring 306 on drive coupler 310. In the extended position, drive coupler 310 is coupled with drive interface 260 of ITU 250. Ledge surface 317 of drive coupler 310 is spaced away from actuator collar 380 as drive interface 260 of ITU 250 pushes back drive coupler 310 in direction D2 against the biasing force of compression spring 306 while actuator lever 360 and actuator collar 380 is held in place by imaging module 75 as frame plate 77 of imaging module 75 remains engaged with engagement member 362 of actuator lever 360. Tab 387 of actuator collar 380 contacts frame 259 of ITU 250 to limit rotation of actuator collar 380 and prevent actuator collar 380 from contacting drive coupler 310 while drive coupler 310 is in the extended position engaged with drive interface 260 of ITU 250.

When imaging module 75 is removed from image forming device 22, the operation of retraction mechanism 350 discussed is reversed. Initially, actuator lever 360 rotates clockwise, as viewed in FIG. 10B, causing actuator collar 380 to move in direction D2 and contact ledge surface 317 of drive coupler 310 as engagement member 362 remains in contact with and follows the motion of frame plate 77 of imaging module 75 when imaging module 75 initially moves in direction D1. As imaging module 75 is further removed from image forming device 22 in direction D1, actuator lever 360 further rotates clockwise causing actuator collar 380 to push drive coupler 310 in direction D2 away from drive interface 260 of ITU 250 until frame plate 77 of imaging module 75 disengages from contacting engagement member 362 of actuator lever 360 thereby causing retraction mechanism 350 to urge drive coupler 310 to return to the retracted position as shown in FIG. 10A.

While the example embodiment illustrated includes an imaging module 75 that engages and disengages a drive coupler 310 that provide rotational motion to components of an ITU 250 in response to the installation and removal of an imaging module 75, it will be appreciated that such an assembly may be configured to engage and disengage drive coupler(s) of any rotatable component within image forming device 22, such as, for example, one or more media feed rolls, one or more toner agitators, fuser 37, etc., in response to the installation and removal of any replaceable unit of image forming device 22 as desired.

Although the example embodiment discussed above includes a pair of replaceable units in the form of toner cartridge 100 and imaging unit 200, it will be appreciated that the replaceable unit(s) of the image forming device may employ any suitable configuration as desired. For example, in one embodiment, the main toner supply for the image forming device, the developer unit and the photoconductor unit are housed in one replaceable unit. In another embodiment, the main toner supply for the image forming device and the developer unit are provided in a first replaceable unit and the photoconductor unit is provided in a second replaceable unit.

Further, it will be appreciated that the architectures and shapes of toner cartridge 100, imaging unit 200, ITU 250, etc. illustrated in FIGS. 5-6 are merely intended to serve as an example. Those skilled in the art understand that toner cartridges, and other toner reservoirs and image forming device components, may take many different shapes and configurations.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. An assembly for an electrophotographic image forming device, comprising:

a rotatable drive coupler movable along an axial direction of the drive coupler between a retracted position and an extended position, in the retracted position the drive coupler is disengaged from a corresponding drive interface of a first replaceable unit when the first replaceable unit is installed in the image forming device, in the extended position the drive coupler is engaged with the corresponding drive interface of the first replaceable unit when the first replaceable unit is installed in the image forming device for providing a rotational force from the drive coupler to the drive interface of the first replaceable unit; and a lever operatively connected to the drive coupler such that the lever causes the drive coupler to move from the retracted position to the extended position upon the lever receiving an actuation force from insertion of a second replaceable unit that is toward the drive coupler along the axial direction.

2. The assembly of claim 1, further comprising a first biasing member biasing the lever toward the retracted position of the drive coupler.

3. The assembly of claim 2, further comprising a second biasing member biasing the drive coupler toward the extended position, wherein the first biasing member retains the drive coupler in the retracted position when the second replaceable unit is removed from the image forming device.

4. The assembly of claim 1, wherein when the drive coupler is engaged with the corresponding drive interface of the first replaceable unit the lever is operatively disengaged from the drive coupler.

5. The assembly of claim 1, wherein the first replaceable unit includes a rotatable transfer belt that is configured to receive toner images from an image donating member and to transfer the toner images to an image receiving medium.

6. The assembly of claim 1, wherein the second replaceable unit includes an imaging module configured to hold one or more imaging units.

7. The assembly of claim 1, wherein the second replaceable unit includes an imaging module configured to hold one or more toner cartridges.

8. The assembly of claim 1, wherein the first replaceable unit is insertable into and removable from the image forming device along a first direction and the second replaceable unit is insertable into and removable from the image forming device along a second direction different from the first direction.

9. An assembly for an electrophotographic image forming device, comprising:

a rotatable drive coupler movable between a retracted position and an extended position, in the retracted position the drive coupler is disengaged from a corresponding drive interface of an image transfer unit having a rotatable transfer belt that is configured to receive toner images from an image donating member and to transfer the toner images to an image receiving medium, in the extended position the drive coupler is engaged with the corresponding drive interface of the image transfer unit for providing a rotational force from the drive coupler to the drive interface of the image transfer unit to rotate the transfer belt; and an actuator operatively connected to the drive coupler such that the actuator moves the drive coupler from the retracted position to the extended position upon the actuator receiving an actuation force from an insertion of an imaging module configured to hold the image donating member into the image forming device, wherein the image transfer unit is insertable into and removable from the image forming device along a first direction and the imaging module is insertable into and removable from the image forming device along a second direction transverse to the first direction.

10. A system for an electrophotographic image forming device, comprising:

an imaging basket insertable into and removable from the image forming device, the imaging basket is configured to hold a plurality of imaging units for forming toner images;

an image transfer unit insertable into and removable from the image forming device, the image transfer unit includes a rotatable transfer belt for receiving the toner images from the plurality of imaging units and a drive interface operatively connected to the transfer belt such that rotation of the drive interface causes rotation of the transfer belt;

a rotatable drive coupler mounted in the image forming device, the drive coupler is movable between a disengaged position and an engaged position, in the disengaged position the drive coupler is disengaged from the drive interface of the image transfer unit when the image transfer unit is installed in the image forming device, in the engaged position the drive coupler is engaged with the drive interface of the image transfer unit when the image transfer unit is installed in the image forming device for providing a rotational force from the drive coupler to the drive interface of the image transfer unit to rotate the transfer belt for transporting the toner images on the transfer belt to a toner transfer area; and an actuator mounted in the image forming device and operatively connected to the drive coupler such that the actuator moves the drive coupler from the disengaged position to the engaged position upon the actuator receiving an actuation force from insertion of the imaging basket into the image forming device, wherein the image transfer unit is insertable into and removable from the image forming device along a first direction and the imaging basket is insertable into and removable from the image forming device along a second direction transverse to the first direction.

11. The system of claim 10, wherein the actuator moves the drive coupler from the engaged position to the disengaged position upon the actuator being disengaged by removal of the imaging basket from the image forming device.

12. An assembly for an electrophotographic image forming device, comprising:

a rotatable drive coupler movable between a retracted position and an extended position, in the retracted position the drive coupler is disengaged from a corresponding drive interface of an image transfer unit having a rotatable transfer belt that is configured to receive toner images from an image donating member and to transfer the toner images to an image receiving medium, in the extended position the drive coupler is engaged with the corresponding drive interface of the image transfer unit for providing a rotational force from the drive coupler to the drive interface of the image transfer unit to rotate the transfer belt;

an actuator operatively connected to the drive coupler such that the actuator moves the drive coupler from the retracted position to the extended position upon the actuator receiving an actuation force from an insertion of an imaging module configured to hold the image donating member into the image forming device; and a first biasing member biasing the actuator toward the retracted position of the drive coupler.

13. The assembly of claim 12, further comprising a second biasing member biasing the drive coupler toward the extended position, wherein the first biasing member retains the drive coupler in the retracted position when the imaging module is removed from the image forming device.

14. An assembly for an electrophotographic image forming device, comprising:

a rotatable drive coupler movable between a retracted position and an extended position, in the retracted position the drive coupler is disengaged from a corresponding drive interface of an image transfer unit having a rotatable transfer belt that is configured to receive toner images from an image donating member and to transfer the toner images to an image receiving medium, in the extended position the drive coupler is engaged with the corresponding drive interface of the image transfer unit for providing a rotational force from the drive coupler to the drive interface of the image transfer unit to rotate the transfer belt; and an actuator operatively connected to the drive coupler such that the actuator moves the drive coupler from the retracted position to the extended position upon the actuator receiving an actuation force from an insertion of an imaging module configured to hold the image donating member into the image forming device, wherein when the drive coupler is engaged with the corresponding drive interface of the image transfer unit the actuator is operatively disengaged from the drive coupler.

15. An assembly for an electrophotographic image forming device, comprising:

a rotatable drive coupler movable between a retracted position and an extended position, in the retracted position the drive coupler is disengaged from a corresponding drive interface of an image transfer unit having a rotatable transfer belt that is configured to receive toner images from an image donating member and to transfer the toner images to an image receiving medium, in the extended position the drive coupler is engaged with the corresponding drive interface of the image transfer unit for providing a rotational force from the drive coupler to the drive interface of the image transfer unit to rotate the transfer belt; and an actuator operatively connected to the drive coupler such that the actuator moves the drive coupler from the retracted position to the extended position upon the actuator receiving an actuation force from an insertion of an imaging module configured to hold the image donating member into the image forming device, wherein the imaging module is insertable into the image forming device along a direction that is toward the drive coupler along an axial direction of the drive coupler.

16. A system for an electrophotographic image forming device, comprising:

an imaging basket insertable into and removable from the image forming device, the imaging basket is configured to hold a plurality of imaging units for forming toner images;

an image transfer unit insertable into and removable from the image forming device, the image transfer unit includes a rotatable transfer belt for receiving the toner images from the plurality of imaging units and a drive interface operatively connected to the transfer belt such that rotation of the drive interface causes rotation of the transfer belt;

a rotatable drive coupler mounted in the image forming device, the drive coupler is movable between a disengaged position and an engaged position, in the disengaged position the drive coupler is disengaged from the drive interface of the image transfer unit when the image transfer unit is installed in the image forming device, in the engaged position the drive coupler is engaged with the drive interface of the image transfer unit when the image transfer unit is installed in the image forming device for providing a rotational force from the drive coupler to the drive interface of the image transfer unit to rotate the transfer belt for transporting the toner images on the transfer belt to a toner transfer area; and an actuator mounted in the image forming device and operatively connected to the drive coupler such that the actuator moves the drive coupler from the disengaged position to the engaged position upon the actuator receiving an actuation force from insertion of the imaging basket into the image forming device, wherein a biasing member in contact with the actuator biases the actuator to bias the drive coupler in the disengaged position when the imaging basket is removed from the image forming device.

17. A system for an electrophotographic image forming device, comprising:

an imaging basket insertable into and removable from the image forming device, the imaging basket is configured to hold a plurality of imaging units for forming toner images;

an image transfer unit insertable into and removable from the image forming device, the image transfer unit includes a rotatable transfer belt for receiving the toner images from the plurality of imaging units and a drive interface operatively connected to the transfer belt such that rotation of the drive interface causes rotation of the transfer belt;

a rotatable drive coupler mounted in the image forming device, the drive coupler is movable between a disengaged position and an engaged position, in the disengaged position the drive coupler is disengaged from the drive interface of the image transfer unit when the image transfer unit is installed in the image forming device, in the engaged position the drive coupler is engaged with the drive interface of the image transfer unit when the image transfer unit is installed in the image forming device for providing a rotational force from the drive coupler to the drive interface of the image transfer unit to rotate the transfer belt for transporting the toner images on the transfer belt to a toner transfer area; and an actuator mounted in the image forming device and operatively connected to the drive coupler such that the actuator moves the drive coupler from the disengaged position to the engaged position upon the actuator receiving an actuation force from insertion of the imaging basket into the image forming device, wherein when the drive coupler is engaged with the drive interface of the image transfer unit the actuator is operatively disengaged from the drive coupler.

18. A system for an electrophotographic image forming device, comprising:

an imaging basket insertable into and removable from the image forming device, the imaging basket is configured to hold a plurality of imaging units for forming toner images;

an image transfer unit insertable into and removable from the image forming device, the image transfer unit includes a rotatable transfer belt for receiving the toner images from the plurality of imaging units and a drive interface operatively connected to the transfer belt such that rotation of the drive interface causes rotation of the transfer belt;

a rotatable drive coupler mounted in the image forming device, the drive coupler is movable between a disengaged position and an engaged position, in the disengaged position the drive coupler is disengaged from the drive interface of the image transfer unit when the image transfer unit is installed in the image forming device, in the engaged position the drive coupler is engaged with the drive interface of the image transfer unit when the image transfer unit is installed in the image forming device for providing a rotational force from the drive coupler to the drive interface of the image transfer unit to rotate the transfer belt for transporting the toner images on the transfer belt to a toner transfer area; and an actuator mounted in the image forming device and operatively connected to the drive coupler such that the actuator moves the drive coupler from the disengaged position to the engaged position upon the actuator receiving an actuation force from insertion of the imaging basket into the image forming device, wherein the imaging basket is insertable into the image forming device along a direction that is toward the drive coupler along an axial direction of the drive coupler.

* * * * *